US012726491B2

(12) United States Patent
Zhang et al.

(10) Patent No.: US 12,726,491 B2
(45) Date of Patent: Sep. 1, 2026

(54) NETWORK ANTI-REPLAY METHOD AND APPARATUS, ELECTRONIC DEVICE, AND STORAGE MEDIUM

(71) Applicant: SANECHIPS TECHNOLOGY CO., LTD., Shenzhen (CN)

(72) Inventors: Zhenfeng Zhang, Shenzhen (CN); Hao Sun, Shenzhen (CN); Zhengxiang Li, Shenzhen (CN); Kun Wang, Shenzhen (CN); Sai Wang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 271 days.

(21) Appl. No.: 18/708,249

(22) PCT Filed: Mar. 21, 2022

(86) PCT No.: PCT/CN2022/082122

§ 371 (c)(1),
(2) Date: May 8, 2024

(87) PCT Pub. No.: WO2023/087590

PCT Pub. Date: May 25, 2023

(65) Prior Publication Data

US 2025/0007927 A1 Jan. 2, 2025

(30) Foreign Application Priority Data

Nov. 18, 2021 (CN) ........................ 202111370631.9

(51) Int. Cl.

*H04L 9/40* (2022.01)
*H04L 1/08* (2006.01)
*H04L 45/24* (2022.01)

(52) U.S. Cl.

CPC ............ *H04L 63/1416* (2013.01); *H04L 1/08* (2013.01); *H04L 45/24* (2013.01);

(Continued)

(58) Field of Classification Search

CPC ....... H04L 1/08; H04L 45/24; H04L 63/1408; H04L 63/1466; H04L 63/123; H04L 63/1425

See application file for complete search history.

(56) References Cited

U.S. PATENT DOCUMENTS

2012/0174216 A1 7/2012 Vukovic et al.
2016/0182453 A1 6/2016 Hu et al.

(Continued)

FOREIGN PATENT DOCUMENTS

CN 102769572 A 11/2012
CN 110890960 A 3/2020

OTHER PUBLICATIONS

European Patent Office, the Extended European Search Report dated Jan. 10, 2025, for corresponding EP application No. 22894136.5.

(Continued)

*Primary Examiner* — Barbara B Anyan

(74) *Attorney, Agent, or Firm* — Li & Cai Intellectual Property (USA) Office

(57) ABSTRACT

The present disclosure provides a network anti-replay method and apparatus, an electronic device, and a storage medium. The method includes: according to a current packet number of a currently received data packet, determining a section to which the current packet number belongs in a replay window, with the replay window being divided into sections, and each section being configured to record packet numbers of L received data packets which belong to the section; and L being smaller than T, and T being a total number of packet numbers belonging to the section; and in a case where the current packet number is not coincident with packet numbers recorded in the determined section and the current packet number is not coincident with packet numbers of recently received N historical data packets, (Continued)

101 according to a current packet number of a currently received data packet, determine a section to which the current packet number belongs in a replay window, with the replay window being divided into a plurality of sections, and each of the plurality of sections being configured to record packet numbers of L received data packets which belong to the section; and L being smaller than T, and T being a total number of packet numbers belonging to the section

102 in a case where the current packet number is not coincident with packet numbers recorded in the determined section to which the current packet number belongs and the current packet number is not coincident with packet numbers of recently received N historical data packets, performing integrity authentication on the currently received data packet, with N being a natural number greater than 1 performing integrity authentication on the currently received data packet, with N being a natural number greater than 1.

20 Claims, 4 Drawing Sheets

(52) U.S. Cl.
CPC ........ *H04L 63/1425* (2013.01); *H04L 63/123* (2013.01); *H04L 63/1408* (2013.01)

(56) References Cited

U.S. PATENT DOCUMENTS

2019/0116111 A1* 4/2019 Izard ....................... H04L 45/24
2021/0385169 A1* 12/2021 Urman ...................... H04L 1/08

OTHER PUBLICATIONS

Gouda M G, et al., “Anti-replay window protocols for secure IP”, Computer Communications and Networks, 2000,IEEE, US, Oct. 16, 2000, pp. 310-315.
Fan Zhao, et al., “RBWA: An Efficient Random-Bit Window-based Authentication Protocol”, GLOBECOM’03 2003, vol. 3, Dec. 1, 2003, pp. 1379-1383.
China Patent Office, the First Office Action dated Apr. 18, 2026, for corresponding CN application No. 202111370631.9 and the English translation thereof.

* cited by examiner

NETWORK ANTI-REPLAY METHOD AND APPARATUS, ELECTRONIC DEVICE, AND STORAGE MEDIUM

CROSS-REFERENCE TO RELATED APPLICATIONS

The present disclosure is a National Phase Application filed under 35 U.S.C. 371 as a national stage of PCT/CN2022/082122, filed on Mar. 21, 2022, an application claiming the priority to Chinese Patent Application No. 202111370631.9 filed on Nov. 18, 2021, the contents of which are incorporated herein by reference in their entirety.

TECHNICAL FIELD

Embodiments of the present disclosure relate to the field of communication transmission, and in particular, to a network anti-replay method and apparatus, an electronic device, and a storage medium.

BACKGROUND

In the Media Access Control Security (MACsec) protocol, parameters for message encapsulation, encryption/decryption, and authentication are all acquired from the Security Association (SA), and include a secret key and an identification number and the like. At a sending side, a 32-bit Packet Number (PN) of user data is marked in a Security Tag (SecTAG), and is subjected to integrity protection or confidentiality protection together with the user data and then sent out together. The PN is automatically added by 1 each time one frame of data is sent, thereby realizing sequential and flow marking. A Sequence Number (SN) in the Internet Protocol Security (IPsec) protocol is equivalent to the PN. Ideally, data packets are received in sequence at a receiving side. But actually, since there is network delay and a path of each packet of data may be different, the data packets may be disordered when arriving at the receiving side. In view of this, a replay window needs to be provided at the receiving side, so as to not only receive the data packets within an out-of-order tolerance range but also filter out delay packets. In addition, a replay attack may also occur in a process between sending the data packets and receiving the data packets, that is, a third party may intercept the data packets sent by the sending side, and repeatedly send messages to the receiving side in a short or long cycle, thus causing network congestion at the receiving side. For example, a replay message may be filtered out if a PN of the replay message falls behind a replay window, but if the PN of the replay message just falls within the replay window, the replay message needs to be identified and filtered. A method in the IPsec protocol is marking a received SN so as to identify and discard a replay message.

In recent years, the communication technology has been rapidly developed, and the resource space desired to be occupied by replay windows becomes larger and larger due to disorder and delay in high-speed networks. For example, at the traffic of 100 Gbps, for a data packet with a typical packet length of 256 B, assuming that a delay of 2 s is allowed, data packets of a maximum of (100 Gbps*2 s)/(256*8 bit)=97M may be disordered, which desires to set a replay window with the capacity of $2^{27}$ bits. If all SNs are marked, a single SA desires a 128-Mbit Random Access Memory (RAM) to store flag bits. Taking the MACsec protocol as an example, one Secure Channel (SC) contains 4 SAs, and a plurality of SCs desire a plurality of 512-Mbit RAMs to store the flags. Taking the IPsec protocol on a security gateway as an example, thousands of connections desire thousands of 128-Mbit RAMs to store the flag bits. All may cause a huge overhead for chip area.

SUMMARY

An embodiment of the present disclosure provides a network anti-replay method, including: determining, according to a current packet number of a currently received data packet, a section to which the current packet number belongs in a replay window, wherein the replay window is divided into a plurality of sections, and each of the plurality of sections is configured to record packet numbers of L received data packets which belong to the section; and L is smaller than T, and T is a total number of packet numbers belonging to the section; and in a case where the current packet number is not coincident with packet numbers recorded in the determined section to which the current packet number belongs and the current packet number is not coincident with packet numbers of recently received N historical data packets, performing integrity authentication on the currently received data packet, with N being a natural number greater than 1.

An embodiment of the present disclosure further provides a network anti-replay apparatus, including: a section determination module, which is configured to determine, according to a current packet number of a currently received data packet, a section to which the current packet number belongs in a replay window, wherein the replay window is divided into a plurality of sections, and each of the plurality of sections is configured to record packet numbers of L received data packets which belong to the section; and L is smaller than T, and T is a total number of packet numbers belonging to the section; and a detection module, which is configured to perform integrity authentication on the currently received data packet in a case where the current packet number is not coincident with packet numbers recorded in the determined section to which the current packet number belongs and the current packet number is not coincident with packet numbers of recently received N historical data packets, with N being a natural number greater than 1.

An embodiment of the present disclosure further provides an electronic device, including: at least one processor; and a memory, which communicates with and is connected to the at least one processor; wherein the memory stores instructions executable by the at least one processor, and the instructions are executed by the at least one processor to cause the at least one processor to perform the network anti-replay method described above.

An embodiment of the present disclosure further provides a computer-readable storage medium storing a computer program which, when executed by a processor, implements the network anti-replay method described above.

DETAIL DESCRIPTION OF EMBODIMENTS

In order to make the objectives, technical solutions and advantages of the embodiments of the present disclosure clearer, each embodiment of the present disclosure will be described in detail below with reference to the accompanying drawings. However, it should be understood by those of ordinary skill in the art that many technical details are proposed in each embodiment of the present disclosure for enabling a better understanding of the present disclosure. However, the technical solutions claimed in the present disclosure can be implemented even in the absence of those technical details and various changes and modifications based on the following embodiments. The division of the following embodiments is for convenience of description, and should not constitute any limitation to the specific implementations of the present disclosure, and if no conflict is incurred, the embodiments can be combined with each other and cross reference to the embodiments is also allowed.

Figure 1:
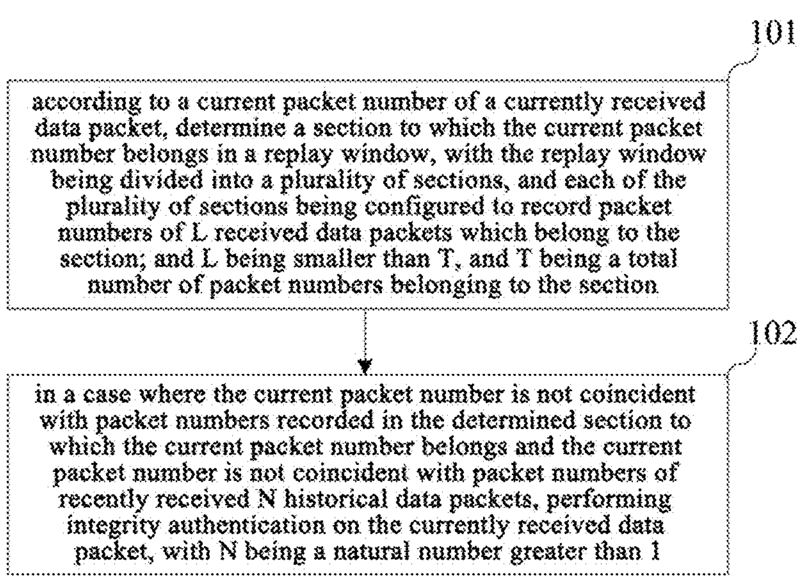
FIG. 1 is a flowchart illustrating a network anti-replay method according to an embodiment of the present disclosure.

An embodiment of the present disclosure relates to a network anti-replay method, an application scenario of the present embodiment may include, but is not limited to, the MACsec protocol, the IPsec protocol, or other scenarios which desire anti-replay, and advantages of the network anti-replay method provided in the present embodiment are more significant in a high-speed network (100 Gbps). The flow of the network anti-replay method provided in the present embodiment may be as shown in FIG. 1, and includes: operation 101, according to a current packet number of a currently received data packet, determining a section to which the current packet number belongs (i.e., a section of the current packet number) in a replay window, with the replay window being divided into a plurality of sections, and each of the plurality of sections being configured to record packet numbers of L received data packets which belong to the section; and L being smaller than T, and T being a total number of packet numbers belonging to the section; and operation 102, in a case where the current packet number is not coincident with packet numbers recorded in the determined section of the current packet number and the current packet number is not coincident with packet numbers of recently received N historical data packets, performing integrity authentication on the currently received data packet, with N being a natural number greater than 1.

Implementation details of the network anti-replay method of the present embodiment are described below, and the following contents are merely for facilitating an understanding of the provided implementation details, but are not necessary for implementing the present embodiment.

At operation 101, according to the current packet number of the currently received data packet, the section of the current packet number in the replay window is determined; the replay window is divided into the plurality of sections, and each of the plurality of sections is configured to record the packet numbers of the L received data packets which belong to the section; and L is smaller than T, and T is the total number of the packet numbers belonging to the section. That is, the replay window is divided into the plurality of sections, and each section records the packet numbers of part of the received data packets; and after the current data packet is subjected to section classification, preliminary detection may be performed according to the packet numbers of part of the received data packets recorded in the section of the current packet number.

In one example, before determining the section of the current packet number in the replay window according to the current packet number of the currently received data packet, the method further includes: determining whether the current packet number is smaller than a window lower limit of the replay window. That is, the current packet number may be screened according to the replay window; and if the current packet number is smaller than the window lower limit of the replay window, it is indicated that the current data packet is possibly a data packet of a sending side intercepted by a third party and a message repeatedly sent to a receiving side in a long cycle, so the currently received data packet is discarded without being subjected to further analysis such as section classification, which can reduce data calculation amount to a great extent.

For example, the current packet number is compared with the lower limit of the replay window, i.e., a lowest acceptable PN (LowestPN). If the current packet number is smaller than the lowest acceptable PN, the currently received data packet is discarded; and if the current packet number is not smaller than the lowest acceptable PN, the section of the current packet number in the replay window is determined according to the current packet number of the currently received data packet. This operation may be called primary anti-replay detection.

In one example, after determining the section of the current packet number in the replay window according to the current packet number of the currently received data packet, the method further includes: in a case where the current packet number is coincident with one of the packet numbers recorded in the determined section of the current packet number or the current packet number is coincident with one of the packet numbers of the recently received N historical data packets, discarding the currently received data packet. That is, after the section of the current packet number is determined, the packet number is compared with the packet numbers recorded in the section. If the packet number is the same as one of the packet numbers recorded in the section, it is indicated that the current data packet is replay data and needs to be discarded, and this process may be called secondary anti-replay detection. If the packet number is not the same as any of the packet numbers recorded in the section, the current packet number is compared with the packet numbers of the recently received historical data packets which may be N data packets; and if the current packet number is the same as one of the packet numbers of the recently received historical data packets, it is also indicated that the currently received data packet is the replay data and needs to be discarded. The process of the comparison with the packet numbers of the recently received historical data packets may be called tertiary anti-replay detection. That is, after the current packet number passes the primary anti-replay detection, the secondary anti-replay detection is performed, and if no same packet number is detected, the tertiary anti-replay detection is then performed.

With the detection of the current packet number performed step by step, there is no need to store all historical packet numbers.

In one example, the replay window is divided into $2^M$ sections; and values of M, L, and N are determined according to a type of a replay attack to be resisted. Types of replay attacks to be resisted include a long-cycle replay attack and a short-cycle replay attack.

For example, for the short-cycle replay attack, the number of the packet numbers recorded in each section in the secondary anti-replay detection is small, which makes it possible that no same packet number is detected. However, since the replay attack is the short-cycle replay attack, the replay data may be included in the recently received historical data packets, so, when the tertiary anti-replay detection is performed, the same packet number may be easily detected when the current packet number is compared with the recently received N historical data packets in the tertiary anti-replay detection. That is, for the short-cycle replay attack, an effect of the tertiary anti-replay detection is better than that of the secondary anti-replay detection, in which case, the larger the value of N, the better. For the long-cycle replay attack, since it is the recently received N historical data packets that are compared with the current packet number in the tertiary anti-replay detection and the replay data in the long-cycle replay attack is the data before a relatively long period of time, the same packet number is not likely to be detected through the comparison with the recently received data packets. However, in the secondary anti-replay detection, a plurality of data packets in the replay window are compared with the currently received data packet, and the data packets in the secondary anti-replay detection include historical data received before the relatively long period of time, so that the replay data before the relatively long period of time is likely to be detected. That is, for the long-cycle replay attack, the secondary anti-replay detection is more effective; and in order to further optimize an effect of the secondary anti-replay detection on the long-cycle replay attack, a larger value may be taken for M, and a larger value may also be taken for L, that is, the number of the sections into which the replay window is divided is made larger, so that the section classification on the currently received data packet is finer, and the number of the packet numbers in each section is larger, which can make it easier to detect the same packet number in the section of the current packet number, that is, the replay data can be detected.

In one example, the current packet number includes: a PN in the MACsec protocol or an SN in the IPsec protocol. The MACsec protocol provides functions of encapsulation, integrity protection, and confidentiality protection for data frames transmitted between stations in a Connectivity Association (CA) at a MAC layer. The IPsec protocol has the same capability, and encapsulation, encryption/decryption, and authenticating may be performed on data messages at an IP layer.

Figure 2:
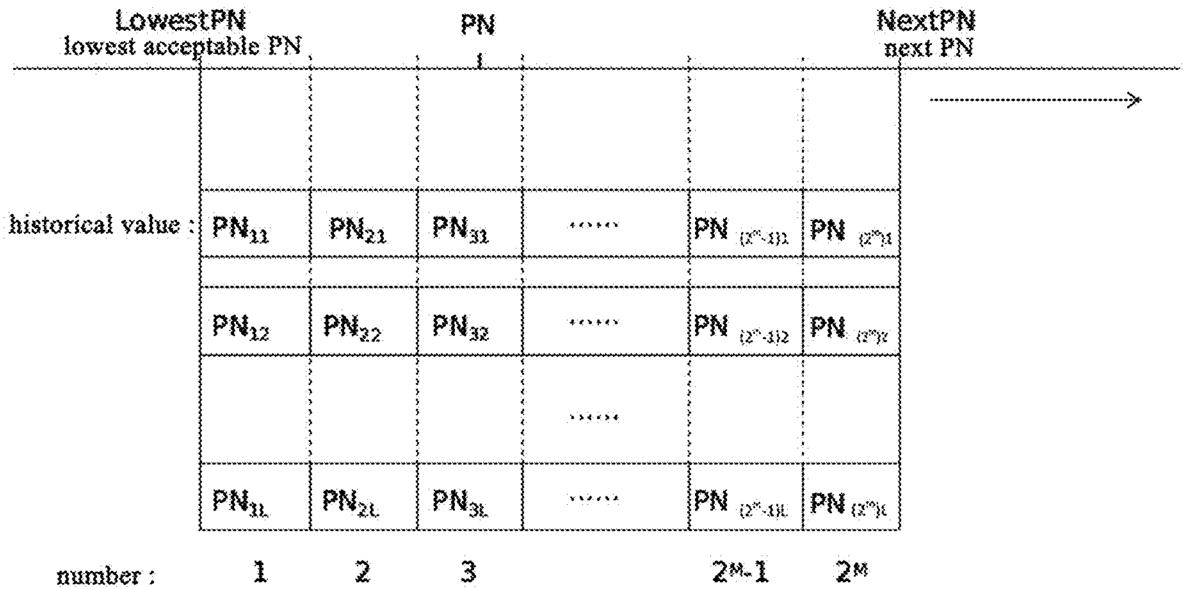
FIG. 2 is a first schematic diagram of a network anti-replay method according to an embodiment of the present disclosure.

As shown in FIG. 2, taking MACsec as an example, in the secondary anti-replay detection, the replay window is divided into 2 sections, and L historical PN values are recorded in each section. When a data packet is received, a section where a PN value of the data packet is located is firstly determined according to the PN value; then the PN value is compared with the L historical PN values in the section, the received data packet is discarded if the PN value is the same as one of the L historical PN values in the section, and the received data packet passes the secondary anti-replay detection if the PN value is not the same as any of the L historical PN values in the section. For example, assuming that a data size of the replay window is $2^{27}$, M=10, L=2, the replay window is divided into 1024 sections, and two history PN values are recorded in each section. When a new data packet is received, a section where a PN value of the new data packet is located is firstly determined, that is, a result of 1024*(PN−LowestPN)/(NextPN−LowestPN) is calculated and rounded up. For example, the result is 3, then the PN value is compared with the two historical PN values in Section 3, and if the PN value is the same as either of the two historical PN values, which indicates that the data packet has been received before and is a replay packet, the data packet is discarded; and if the PN value is different from either of the two historical PN values, the tertiary anti-replay detection process is performed. In the tertiary anti-replay detection process, N historical PN values are recorded; and after the PN value is received, the PN value is compared with the N historical PN values, and if the PN value is the same as one of the N historical PN values, the data packet is discarded; and if the PN value is different from any of the N historical PN values, the data packet passes the tertiary anti-replay detection. Here, NextPN is a next packet number.

In addition, when the data size of the replay window is $2^{27}$ and M=10, that is, when the replay window is divided into 1024 sections, $T=2^{17}$.

Figure 3:
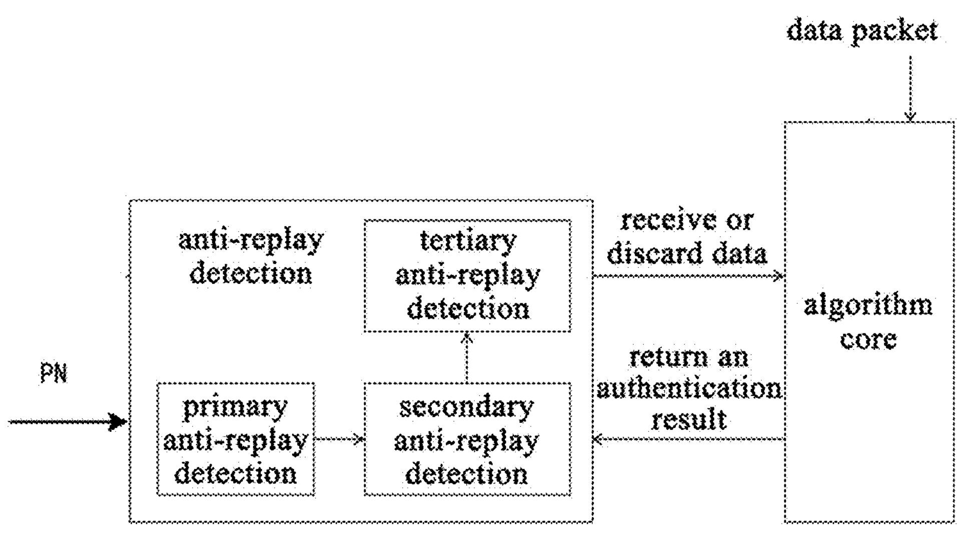
FIG. 3 is a second schematic diagram of a network anti-replay method according to an embodiment of the present disclosure.

At operation 102, in the case where the current packet number is not coincident with the packet numbers recorded in the determined section of the current packet number and the current packet number is not coincident with the packet numbers of the recently received N historical data packets, integrity authentication is performed on the currently received data packet, with N being a natural number greater than 1. After passing the secondary anti-replay detection and the tertiary anti-replay detection, the currently received data packet is sent to an algorithm core to be subjected to integrity authentication, and if the data packet passes the integrity authentication, other operations such as returning an authentication result are performed, as shown in FIG. 3. The integrity authentication refers to verifying the data packet by an authentication algorithm to generate a message authentication code with a specific length, and comparing with a message authentication code carried by the data packet. If the message authentication code carried by the data packet is the same as the generated message authentication code, it is indicated that the data packet has not been tampered with or lost, so the data packet passes the integrity authentication.

In one example, after performing integrity authentication on the currently received data packet, the method further includes: in a case where the currently received data packet passes the integrity authentication, updating the determined section of the current packet number according to the current packet number, and/or updating the packet numbers of the N historical data packets according to the current packet number. That is, the related parameters in the secondary anti-replay detection and the tertiary anti-replay detection are updated.

Figure 4:
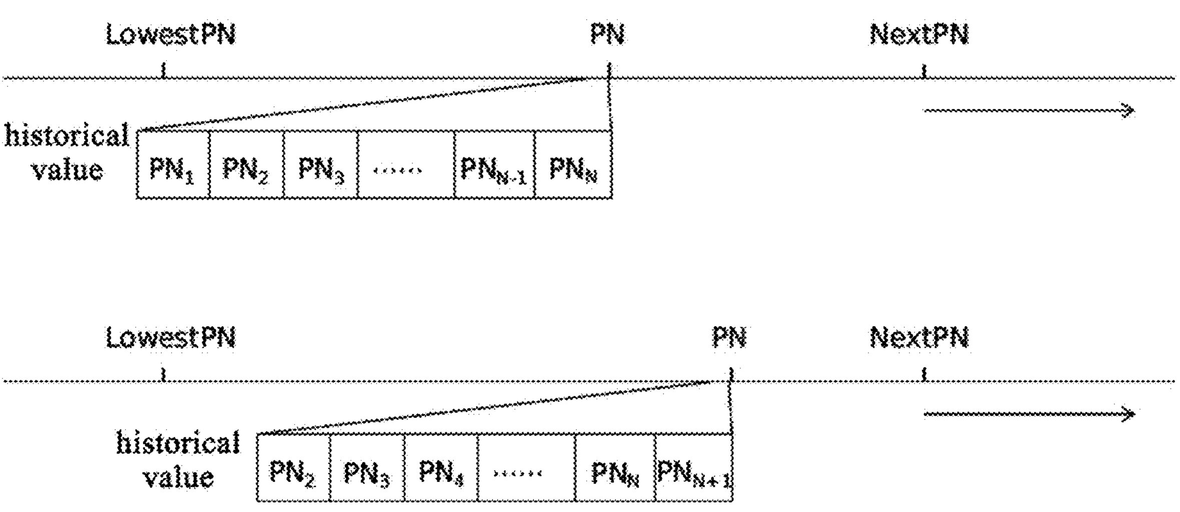
FIG. 4 is a third schematic diagram of a network anti-replay method according to an embodiment of the present disclosure.

For example, after passing the secondary anti-replay detection and the tertiary anti-replay detection, the currently received data packet is sent to the algorithm core for the integrity authentication. After the currently received data packet passes the authentication, a PN value of the currently received data packet is stored in a historical record, and a record table is refreshed to cover an earliest historical PN value, thus updating the packet numbers of the N historical data packets, i.e., updating the parameters in the tertiary anti-replay detection, as shown in FIG. 4. When an attacker intercepts the message and performs a replay attack in a relatively short cycle, this type of attack can be detected according to a partial record, thereby resisting the replay attack.

In addition, when the data size of the replay window is $2^{27}$, M=10, L=2, the replay window is divided into 1024 sections, and two historical PN values are recorded in each section. In a case where a new data packet is received and it is determined that a PN value of the new data packet is located in Section 3, after the new data packet is detected and passes the authentication, the PN value is stored in Section 3 to cover the earliest PN value of the two historical PN values. That is, the parameters selected in the secondary anti-replay detection process are updated. When an attacker intercepts the message and performs a replay attack in a relatively long cycle, the replay attack may not be detected according to a recent historical record, but the historical PN values in each section are recorded in a global PN record (i.e., section data in the secondary anti-replay detection), and the replay attack in the relatively long cycle can be resisted by comparison with the values in the global PN record. If the number of the messages intercepted by the attacker is large and PN values of replay messages are different, replay attacks can be resisted by taking a larger value for L to increase the amount of the data stored in each section.

In one example, after performing integrity authentication on the currently received data packet, the method further includes: refreshing the replay window in a case where the currently received data packet passes the integrity authentication and the current packet number is larger than or equal to a window upper limit of the replay window. That is, the current packet number is compared with the upper limit of the replay window, i.e., a next PN (NextPN), and if the current packet number is smaller than NextPN, the window is kept unchanged; and if the current packet number is not smaller than NextPN, the upper limit of the replay window is refreshed to be PN+1, and LowestPN is refreshed synchronously.

Figure 5:
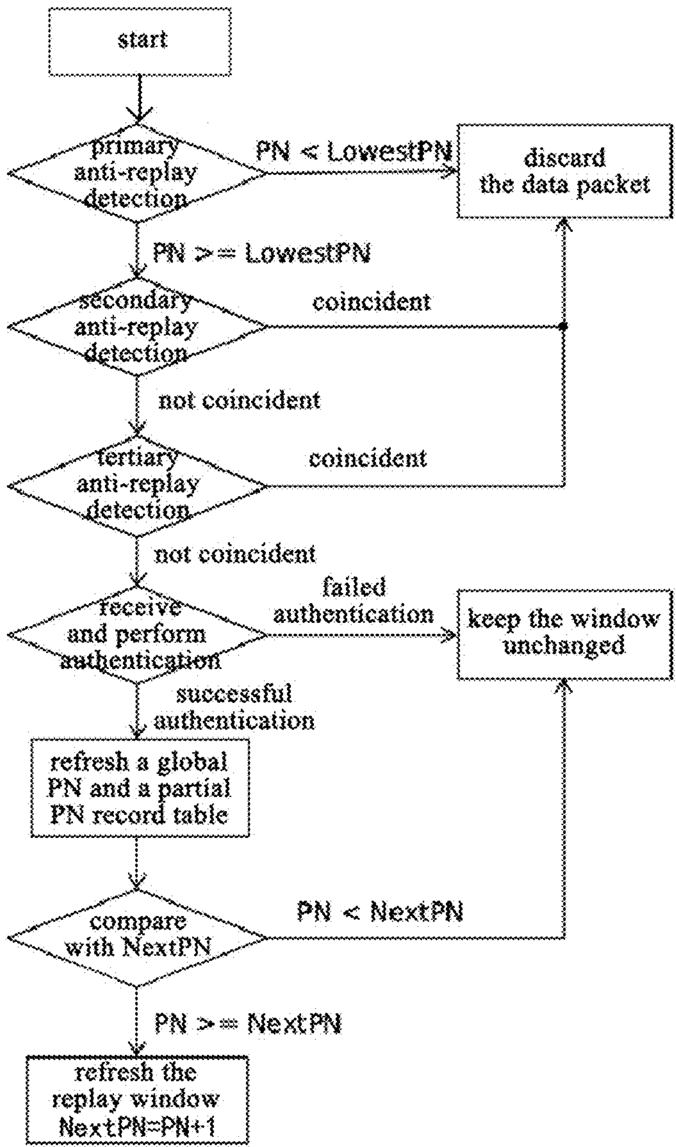
FIG. 5 is a fourth schematic diagram of a network anti-replay method according to an embodiment of the present disclosure.

In an implementation, if the replay window is divided into 1024 sections and a calculated result of the section where the PN is located exceeds 1024, it is indicated that the PN falls on a right side of the replay window, that is, the PN does not belong to the current replay window, then the PN is directly transmitted to a next stage, and the values recorded in Section 1024 are refreshed after the PN passes the authentication. In addition, an implementation process of the network anti-replay method is shown in FIG. 5, and in the implementation process, refreshing a global PN refers to updating the packet numbers in the replay window to which the current packet number belongs in the secondary anti-replay detection process, and refreshing a partial PN record table refers to updating the packet numbers of the historical N data packets in the tertiary anti-replay detection process.

In addition, by implementing the method provided in the present implementation, a memory size desired to be occupied is $(2^{M}*L+N)*32$ bit. For example, when M is 10, L is 2, and N is $2^{17}$, interception of two or less replay packets can be resisted, and an overhead of the memory size is 4 Mbit, which is reduced by 30 times compared to recording all the historical PN values.

In this implementation, the replay window is divided, the section of the current packet number of the currently received data packet is identified, and repeatability detection is performed in the section of the current packet number, or further repeatability detection is performed according to the recently received N historical data packets, so as to determine whether the currently received data packet is the replay data. With no need to store flags for all the received historical data packets, storage resources occupied by the replay window in the anti-replay process are greatly reduced, and the demand for RAMs and the overhead of chip area can also be reduced.

Figure 6:
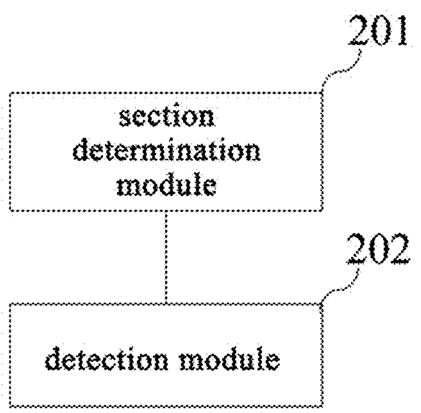
FIG. 6 is a schematic diagram of a network anti-replay apparatus according to another embodiment of the present disclosure.

An implementation of the present disclosure relates to a network anti-replay apparatus as shown in FIG. 6, including:

a section determination module 201, which is configured to determine, according to a current packet number of a currently received data packet, a section to which the current packet number belongs (i.e., a section of the current packet number) in a replay window, with the replay window being divided into a plurality of sections, and each of the plurality of sections being configured to record packet numbers of L received data packets which belong to the section; and L being smaller than T, and T being a total number of packet numbers belonging to the section; and a detection module 202, which is configured to perform integrity authentication on the currently received data packet in a case where the current packet number is not coincident with packet numbers recorded in the determined section of the current packet number and the current packet number is not coincident with packet numbers of recently received N historical data packets, with N being a natural number greater than 1.

For the section determination module 201, in one example, before determining, according to the current packet number of the currently received data packet, the section of the current packet number in the replay window, the section determination module 201 is further configured to determine whether the current packet number is smaller than a window lower limit of the replay window.

In one example, after determining, according to the current packet number of the currently received data packet, the section of the current packet number in the replay window, the network anti-replay apparatus is further configured to discard the currently received data packet in a case where the current packet number is coincident with one of the packet numbers recorded in the determined section of the current packet number or the current packet number is coincident with one of the packet numbers of the recently received N historical data packets.

In one example, the replay window is divided into $2^{M}$ sections; and values of M, L, and N are determined according to a type of a replay attack to be resisted.

In one example, the current packet number includes: a PN in the MACsec protocol or an SN in the IPsec protocol.

For the detection module 202, in one example, after performing integrity authentication on the currently received data packet, the detection module 202 is further configured to, in a case where the currently received data packet passes the integrity authentication, update the determined section of the current packet number according to the current packet number, and/or update the packet numbers of the N historical data packets according to the current packet number.

In one example, after perform integrity authentication on the currently received data packet, the network anti-replay apparatus is further configured to refresh the replay window in a case where the currently received data packet passes the integrity authentication and the current packet number is larger than or equal to a window upper limit of the replay window.

In this implementation, the replay window is divided, the section of the current packet number of the currently received data packet is identified, and repeatability detection is performed in the section of the current packet number, or further repeatability detection is performed according to the recently received N historical data packets, so as to determine whether the currently received data packet is replay data. With no need to store flags for all the received historical data packets, storage resources occupied by the replay window in an anti-replay process are greatly reduced, and the demand for RAMs and the overhead of chip area can also be reduced.

Apparently, this implementation is a system embodiment corresponding to the aforesaid implementation, and may be implemented in cooperation with the aforesaid implementation. The related technical details stated in the aforesaid implementation are still valid in this implementation, and will not be described in detail here for avoiding repetition. Correspondingly, the related technical details stated in this implementation can also be applied to the aforesaid implementation.

It should be noted that each module in this implementation is a logic module, and in practical applications, one logical unit may be one physical unit or a part of one physical unit, and may also be implemented as a combination of a plurality of physical units. In addition, in order to highlight the innovative part of the present disclosure, a unit not so closely related to the solution to the technical problem proposed by the present disclosure is not introduced in this implementation, but this does not mean that no other unit is provided in this implementation.

Figure 7:
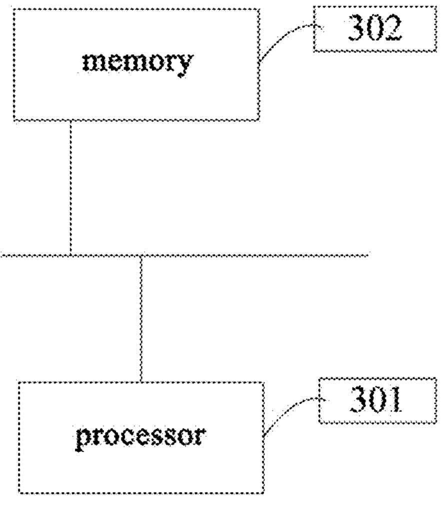
FIG. 7 is a schematic structural diagram of an electronic device according to still another embodiment of the present disclosure.

Another embodiment of the present disclosure relates to an electronic device. As shown in FIG. 7, the electronic device includes: at least one processor 301; and a memory 302 which communicates with and is connected to the at least one processor 301. The memory 302 stores instructions executable by the at least one processor 301, and the instructions are executed by the at least one processor 301 to cause the at least one processor 301 to perform the network anti-replay method described in the aforesaid embodiment.

The memory and the processor are connected by a bus, the bus may include any number of interconnected buses and bridges, and the buses connect various circuits of one or more of processors and the memory. The bus may also connect various other circuits such as a peripheral device, a voltage regulator, and a power management circuit, which is well known in the existing technology and thus will not be further described here. A bus interface provides an interface between the bus and a transceiver. The transceiver may be one element or a plurality of elements such as a plurality of receivers and a plurality of transmitters, and provides a unit for communicating with various other devices on a transmission medium. Data processed by the processor is transmitted on a wireless medium via an antenna. Furthermore, the antenna receives data and transmits the data to the processor.

The processor is configured to manage the bus and general processing, and may also perform various functions including timing, peripheral interface, voltage regulation, power management and other control functions. The memory may be configured to store data used by the processor when performing operations.

Another embodiment of the present disclosure relates a computer-readable storage medium storing a computer program, which when executed by a processor, causes the processor to implement the above method embodiments.

That is, as can be understood by those of ordinary skill in the art, implementation of all or part of the operations of the method described in the above embodiments may be achieved by a program instructing related hardware, and the program is stored in a storage medium and includes several instructions to enable a device (which may be a single chip, a chip, etc.) or a processor to perform all or part of the operations of the method described in each embodiment of the present application. The above storage medium includes: a Universal Serial Bus Flash Disk (a USB flash disk), a mobile hard disk, a Read-Only Memory (ROM), a Random Access Memory (RAM), a magnetic disk, an optical disc, or various media capable of storing program codes.

It should be understood by those of ordinary skill in the art that the above implementations are exemplary embodiments of the present disclosure, and various changes in forms and details may be made to the implementations without departing from the spirit and scope of the present disclosure.

What is claimed is:

1. A network anti-replay method, comprising:

determining, according to a current packet number of a currently received data packet, a section to which the current packet number belongs in a replay window, wherein the replay window is divided into a plurality of sections, and each of the plurality of sections is configured to record packet numbers of L received data packets which belong to the section; and L is smaller than T, and T is a total number of packet numbers belonging to the section; and in a case where the current packet number is not coincident with packet numbers recorded in the determined section to which the current packet number belongs and the current packet number is not coincident with packet numbers of recently received N historical data packets, performing integrity authentication on the currently received data packet, with N being a natural number greater than 1.

2. The network anti-replay method of claim 1, before determining, according to the current packet number of the currently received data packet, the section to which the current packet number belongs in the replay window, the network anti-replay method further comprises:

determining whether the current packet number is smaller than a window lower limit of the replay window.

3. The network anti-replay method of claim 1, after determining, according to the current packet number of the currently received data packet, the section to which the current packet number belongs in the replay window, the network anti-replay method further comprises:

in a case where the current packet number is coincident with one of the packet numbers recorded in the determined section to which the current packet number belongs or the current packet number is coincident with one of the packet numbers of the recently received N historical data packets, discarding the currently received data packet.

4. The network anti-replay method of claim 1, after performing integrity authentication on the currently received data packet, the network anti-replay method further comprises:

in a case where the currently received data packet passes the integrity authentication, updating the determined section to which the current packet number belongs according to the current packet number, and/or, updating the packet numbers of the N historical data packets according to the current packet number.

5. The network anti-replay method of claim 1, after performing integrity authentication on the currently received data packet, the network anti-replay method further comprises:

refreshing the replay window in a case where the currently received data packet passes the integrity authentication and the current packet number is larger than or equal to a window upper limit of the replay window.

6. The network anti-replay method of claim 1, wherein the replay window is divided into $2^M$ sections; and values of M, L, and N are determined according to a type of a replay attack to be resisted.

7. The network anti-replay method of claim 1, wherein the current packet number comprises: a Packet Number in Media Access Control Security (MACsec) protocol or a Sequence Number in Internet Protocol Security (IPsec) protocol.

8. A network anti-replay apparatus, comprising a processor and a memory having instructions stored thereon which, when executed by the processor, cause the processor to:

determine, according to a current packet number of a currently received data packet, a section to which the current packet number belongs in a replay window, wherein the replay window is divided into a plurality of sections, and each of the plurality of sections is configured to record packet numbers of L received data packets which belong to the section; and L is smaller than T, and T is a total number of packet numbers belonging to the section; and perform integrity authentication on the currently received data packet in a case where the current packet number is not coincident with packet numbers recorded in the determined section to which the current packet number belongs and the current packet number is not coincident with packet numbers of recently received N historical data packets, with N being a natural number greater than 1.

9. An electronic device, comprising:

at least one processor; and a memory communicating with and connected to the at least one processor; wherein the memory stores instructions executable by the at least one processor, and the instructions are executed by the at least one processor to cause the at least one processor to:

determine, according to a current packet number of a currently received data packet, a section to which the current packet number belongs in a replay window, wherein the replay window is divided into a plurality of sections, and each of the plurality of sections is configured to record packet numbers of L received data packets which belong to the section; and L is smaller than T, and T is a total number of packet numbers belonging to the section; and perform integrity authentication on the currently received data packet in a case where the current packet number is not coincident with packet numbers recorded in the determined section to which the current packet number belongs and the current packet number is not coincident with packet numbers of recently received N historical data packets, with N being a natural number greater than 1.

10. A non-transitory computer-readable storage medium storing a computer program which, when executed by a processor, causes the processor to implement the network anti-replay method of claim 1.

11. The network anti-replay apparatus of claim 8, wherein the memory has instructions stored thereon which, when executed by the processor, further cause the processor to:

before determining, according to the current packet number of the currently received data packet, the section to which the current packet number belongs in the replay window, determine whether the current packet number is smaller than a window lower limit of the replay window.

12. The network anti-replay apparatus of claim 8, wherein the memory has instructions stored thereon which, when executed by the processor, further cause the processor to:

after determining, according to the current packet number of the currently received data packet, the section to which the current packet number belongs in the replay window, in a case where the current packet number is coincident with one of the packet numbers recorded in the determined section to which the current packet number belongs or the current packet number is coincident with one of the packet numbers of the recently received N historical data packets, discard the currently received data packet.

13. The network anti-replay apparatus of claim 8, wherein the memory has instructions stored thereon which, when executed by the processor, further cause the processor to:

after performing integrity authentication on the currently received data packet, in a case where the currently received data packet passes the integrity authentication, update the determined section to which the current packet number belongs according to the current packet number, and/or, update the packet numbers of the N historical data packets according to the current packet number.

14. The network anti-replay apparatus of claim 8, wherein the memory has instructions stored thereon which, when executed by the processor, further cause the processor to:

after performing integrity authentication on the currently received data packet, refresh the replay window in a case where the currently received data packet passes the integrity authentication and the current packet number is larger than or equal to a window upper limit of the replay window.

15. The network anti-replay apparatus of claim 8, wherein the replay window is divided into $2^M$ sections; and values of M, L, and N are determined according to a type of a replay attack to be resisted.

16. The network anti-replay apparatus of claim 8, wherein the current packet number comprises: a Packet Number in Media Access Control Security (MACsec) protocol or a Sequence Number in Internet Protocol Security (IPsec) protocol.

17. The electronic device of claim 9, wherein the instructions are executed by the at least one processor to further cause the at least one processor to:

before determining, according to the current packet number of the currently received data packet, the section to which the current packet number belongs in the replay window, determine whether the current packet number is smaller than a window lower limit of the replay window.

18. The electronic device of claim 9, wherein the instructions are executed by the at least one processor to further cause the at least one processor to:

after determining, according to the current packet number of the currently received data packet, the section to which the current packet number belongs in the replay window, in a case where the current packet number is coincident with one of the packet numbers recorded in the determined section to which the current packet number belongs or the current packet number is coincident with one of the packet numbers of the recently received N historical data packets, discard the currently received data packet.

19. The electronic device of claim 9, wherein the instructions are executed by the at least one processor to further cause the at least one processor to:

after performing integrity authentication on the currently received data packet, in a case where the currently received data packet passes the integrity authentication, update the determined section to which the current packet number belongs according to the current packet number, and/or, update the packet numbers of the N historical data packets according to the current packet number.

20. The electronic device of claim 9, wherein the instructions are executed by the at least one processor to further cause the at least one processor to:

after performing integrity authentication on the currently received data packet, refresh the replay window in a case where the currently received data packet passes the integrity authentication and the current packet number is larger than or equal to a window upper limit of the replay window.

* * * * *